Dec. 25, 1956 G. W. BIXLER ET AL 2,775,470
EXHAUST STACK VIBRATION ISOLATOR
Filed June 30, 1951

Inventors
George W. Bixler
& Carl A. Bierlein
By Willits, Helmig & Baillio
Attorneys United States Patent Office 2,775,470
Patented Dec. 25, 1956

2,775,470

EXHAUST STACK VIBRATION ISOLATOR

George W. Bixler and Carl A. Bierlein, Cleveland, Ohio, assignors to General Motors Corporation, Detroit, Mich., a corporation of Delaware Application June 30, 1951, Serial No. 234,532

5 Claims. (Cl. 285—96)

This invention generally relates to pipe connecting means and more particularly relates to connecting means for internal combustion engine exhaust pipes which are subjected to vibration and wide variations in temperatures.

The object of the invention is to provide a simple pressure sealed, yieldable exhaust pipe connection for a supercharged internal combustion engine to effectively seal the connection against leakage of exhaust gas upon yielding of the connection as a result of engine vibration and expansion and contraction of the exhaust pipe.

The combined means for accomplishing this object will become apparent by reference to the following detailed description and accompanying drawings illustrating one form of the invention which is particularly adapted to internal combustion engines having exhaust pipe connections subjected to movement and expansion and supplied with combustion air by a supercharger.

Figure 1:
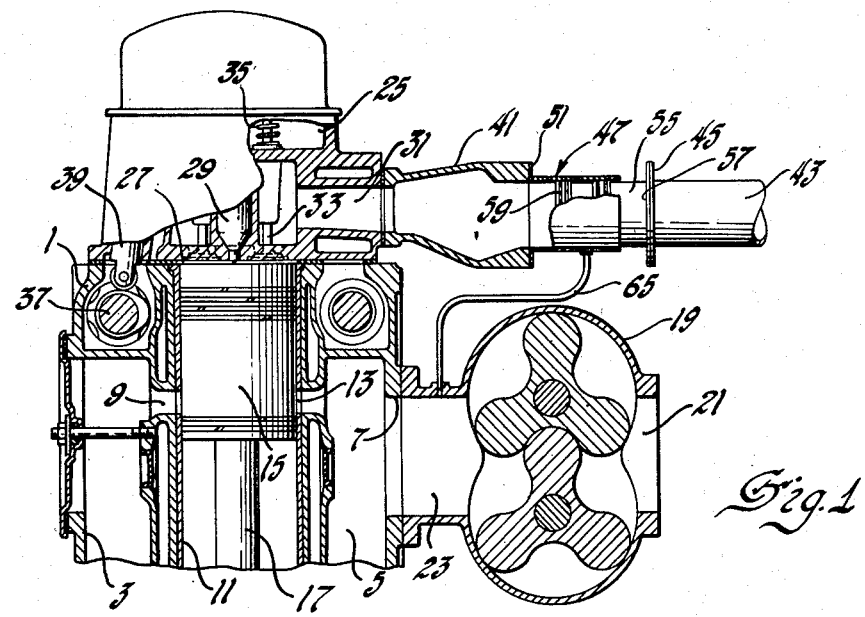

Figure 1 of the drawings is a vertical cross sectional view of an engine and the intake air and the exhaust connections with parts shown broken away and in section.

Figure 2:
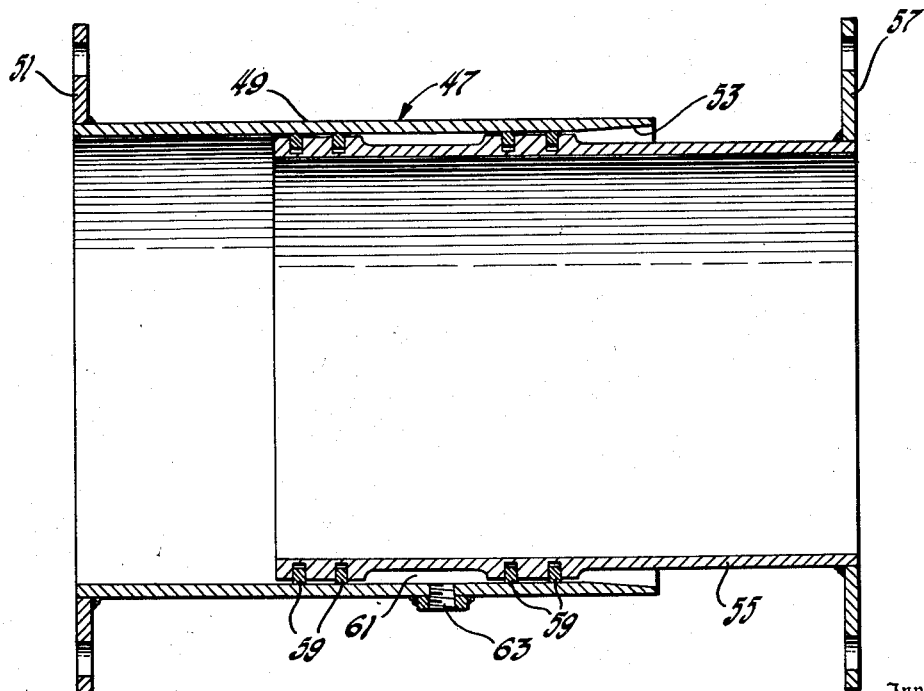

Figure 2 is an enlarged view of a detail, shown in Figure 1, to better illustrate the invention.

As best illustrated in Figure 1, an internal combustion engine 1 is shown provided with a hollow frame 3 including a combustion air space 5 with an inlet passage 7 opening therein and a cylinder bore provided with a circumferential belt of air inlet ports 9 extending therefrom and opening into the engine air space 5. A cylinder liner 11 in this bore is provided with a belt of air inlet ports 13 registering with the ports 9 in the bore. A piston 15 is slidable in the cylinder liner past the ports 13 and a connecting rod 17 interconnects the piston 15 to one throw of the engine crankshaft, not shown, in conventional manner.

A supercharger, illustrated in the drawing as a Roots blower 19, is secured on the engine frame 3 and is driven by the engine. The blower 19 is provided with an air inlet passage 21 and an air pressure discharge passage 23 shown registering with the air inlet passage 7 of the engine air space 5.

A cylinder head 25 is secured to the engine frame 3 and forms the engine combustion chamber 27 adjacent the head of the piston 15. The cylinder head 25 is provided with an opening extending axially into the combustion chamber 27 and a fuel injection pump 29 is located in this opening for injecting fuel into this chamber. An exhaust passage 31 extends from one side of the cylinder head 25 to an exhaust valve seat adjacent the fuel injection pump in the inner face of the cylinder head and an exhaust valve 33 is normally retained seated on the exhaust valve seat by a spring 35. The fuel injection pump 29 and exhaust valve 33 is operable by a camshaft 37, rotatable in the engine frame in timed relation with the engine, and cam follower means 39 and suitable linkage, not shown, in conventional manner. An exhaust manifold 41 is secured on the cylinder head 25 in communication with the cylinder exhaust passages 31 therein and an exhaust pipe 43 having a connecting flange 45 is connected to the exhaust manifold 41 by means of an air pressure sealed, yieldable exhaust pipe connection generally indicated by the reference character 47 in Figure 1 and shown in detail in Figure 2.

This exhaust connection 47 includes an outer exhaust tube 49 having an external connecting flange 51 on one end and secured to the exhaust manifold 41 and a tapered internal entrance surface 53 in the opposite end into which an inner exhaust tube 55 is slidable. The outer end of the inner tube 55 is provided with an external connecting flange 57 secured to the exhaust pipe flange 45. The inner end of the inner tube 55 is provided with a plurality of longitudinally spaced, exterior annular packing ring grooves containing split, resilient packing rings 59 in sealing engagement with the internal surface of the outer tube 49 and an elongated external groove 61 intermediate the packing ring grooves and forming a pressure sealing space between the packing rings 59 and internal surface of the outer tube 49. The outer exhaust tube 49 is provided with a pressure inlet port 63 in continuous register with the pressure sealing space formed by the elongated external groove 61 in the inner exhaust tube 55 and a pressure supply tube 65 is shown in Figure 1, connected between this pressure supply port and the pressure discharge outlet 23 of the engine driven blower 19.

The sealing air pressure supplied by the supercharger or blower 19 to the sealing space intermediate the packing rings 59 is thus maintained at a pressure value in excess of the exhaust pipe 43 and the packing rings are thus urged by this pressure into tight sealing engagement with the outer side walls of the packing ring grooves in the inner tube member 55. The sealing air pressure also enters the spaces between the bottom surfaces of the packing ring grooves and the internal surfaces thereof and this urges the external surfaces of the rings into tighter sealing engagement with the internal surface of the outer exhaust tube 49. The packing rings 59 between this two part, tubular exhaust pipe connection 47 are thus urged by the greater air pressure from the engine blower 19 into sealing relation with the tubular members and these members are free to move relative to each other due to expansion and engine vibration. It will be noted that if leakage occurs past the packing rings 59 it will be air leakage and this air will pass outwardly to atmosphere through the tapered entrance 53 of the outer tube 49 or into the outer tube 49 and exhaust pipe 43 as the air pressure supplied is at a value above that of atmosphere and also above the pressure of the exhaust from the engine.

We claim:

1. In combination, a vibration isolating pipe connection including an outer pipe and an inner pipe loosely mounted therein and provided with longitudinally spaced groups of annular packing ring grooves in the outer surface and a pressure sealing groove intermediate the groups of packing ring grooves, resilient packing rings in the packing ring grooves, a fluid pressure sealing connection in the outer pipe registering with the pressure sealing groove in the inner pipe, said annular grooves being of sufficient depth to provide an annular space between the packing rings and the bottoms of the grooves to permit isolating of transverse vibrations between the pipes, and means continuously supplying fluid to said connection at a pressure in excess of the pressure within said inner pipe.

2. A pipe connection comprising loosely telescoping pipes, at least one of said pipes including at least two longitudinally spaced packing ring grooves facing said other pipe, packing rings in the packing ring grooves of the one pipe in sealing engagement with the other pipe to form a fluid pressure sealing space between the pipes and adjacent packing rings, said annular grooves being of a depth sufficient to provide an annular space between the packing rings and the bottoms of the grooves to thereby isolate transverse vibrations occurring between said pipes, one of said pipes having a high pressure fluid sealing port opening into the fluid sealing space to retain the packing rings in fluid sealing engagement with the pipes, and means continuously supplying fluid to said port at a pressure at least equal to the pressure existing within said inner pipe.

3. In combination, an exhaust gas pipe line including telescopically disposed pipe sections, the inner pipe section having longitudinally spaced external grooves, expansible packing rings in the grooves and engaging the internal surface of the outer exhaust pipe section, said external grooves being of sufficient depth to provide an annular space between the packing rings and the bottoms of the grooves permitting transverse vibratory movement of the pipes relative to each other, said outer exhaust pipe section having a port opening into the space between the packing rings, a blower supplying air at a pressure greater than the pressure in the exhaust pipe and a pipe connection interconnecting the blower outlet to the port in the outer exhaust pipe section to apply sealing air pressure to the inner side and internal surface of the packing rings.

4. In combination, an engine exhaust gas pipe line including a pipe connection, said connection comprising loosely interfitting inner and outer tubular members, the outer sleeve member having a tapered entrance to receive the inner member and a port spaced inwardly of the entrance, said inner member having external grooves disposed in spaced relation with respect to the port in the outer member, split expansible packing rings in the grooves in the inner member adapted to be compressed into sealing engagement with the internal surface of the outer member upon insertion therein of the rings past the tapered entrance portion thereof, said external grooves being of sufficient depth to provide an annular space between the packing rings and the bottoms of the grooves to thereby permit transverse vibratory movement of the pipes relative to each other, and means to supply air under pressure to the port in the outer member to retain the packing rings in exhaust gas sealing relation with the inner and outer tubular members.

5. A vibration isolating expansion joint comprising loosely telescoping pipe sections, at least one of said pipe sections having a plurality of longitudinally spaced groups of packing ring grooves, packing rings in the packing ring grooves of the one pipe section in sealing engagement with the other pipe section, said ring grooves being of sufficient depth to provide an annular space between the packing rings and the bottoms of the grooves thereby isolating transverse vibrations between the pipe sections, one of said pipe sections having a pressure fluid connection extending therethrough to the space between the pipe sections intermediate the groups of packing ring grooves to apply sealing pressure to the packing rings, and means continuously supplying fluid to said opening at a pressure in excess of the pressure within said inner pipe section.

References Cited in the file of this patent

UNITED STATES PATENTS

| | | |
|---|---|---|
| 317,408 | Moeser | May 5, 1885 |
| 1,861,726 | Trout | June 7, 1932 |
| 1,994,169 | Comins | Mar. 12, 1935 |
| 2,295,436 | Tendler | Sept. 8, 1942 |
| 2,319,543 | Hall | May 18, 1943 |
| 2,419,079 | Jaxtheimer | Apr. 15, 1947 |
| 2,422,502 | Schrader | June 17, 1947 |
| 2,494,659 | Huyton | Jan. 17, 1950 |
| 2,616,255 | Altorfer | Nov. 4, 1952 |

FOREIGN PATENTS

| | | |
|---|---|---|
| 24,104 | Great Britain | Oct. 31, 1907 |

OTHER REFERENCES

Serial No. 367,667, Anxionnaz et al. (A. P. C.), published April 27, 1943.